United States Patent
Abe et al.

[19]

[11] Patent Number: 5,906,000
[45] Date of Patent: May 18, 1999

[54] COMPUTER WITH A CACHE CONTROLLER AND CACHE MEMORY WITH A PRIORITY TABLE AND PRIORITY LEVELS

[75] Inventors: Yuichi Abe, Tokyo; Tsukasa Matoba, Kawasaki, both of Japan

[73] Assignee: Kabushiki Kaisha Toshiba, Kawasaki, Japan

[21] Appl. No.: 08/802,840

[22] Filed: Feb. 18, 1997

[30] Foreign Application Priority Data

Mar. 1, 1996 [JP] Japan ................................. 8-044975

[51] Int. Cl.$^6$ ........................................................ G06F 12/00
[52] U.S. Cl. ........................... 711/151; 711/158; 711/133; 711/159
[58] Field of Search .................................... 711/160, 136, 711/151, 147, 159, 133, 135, 134, 117, 118

[56] References Cited

U.S. PATENT DOCUMENTS

| | | | |
|---|---|---|---|
| 4,490,782 | 12/1984 | Dixon et al. | 711/136 |
| 5,644,753 | 7/1997 | Ebrahim et al. | 711/131 |
| 5,651,135 | 7/1997 | Hatakeyama | 711/128 |

FOREIGN PATENT DOCUMENTS 3058252  3/1991  Japan.

*Primary Examiner*—Tod R. Swann
*Assistant Examiner*—Mehdi Namazi
*Attorney, Agent, or Firm*—Finnegan, Henderson, Farabow, Garrett & Dunner, L.L.P.

[57] ABSTRACT

A computer system according to the present invention comprises a processor, a priority table for storing an address indicative of the original location of each of data items to be read by the processor, and a priority corresponding to the frequency of access by the processor to read each of the data items, a cache memory for storing, in units of cache blocks, part of the data items to be read by the processor, the cache memory having a tag which stores an address and a priority corresponding to each of the data items, and a controller including means for obtaining, when a cache miss has occurred, a priority corresponding to data whose reading is requested by the processor, by referring to the priority table and using an address included in the data-reading request of the processor, and means for comparing the obtained priority with a priority of data stored in a predetermined cache block in the cache memory, thereby to determine whether or not data replacement should be performed in the predetermined cache block.

23 Claims, 4 Drawing Sheets

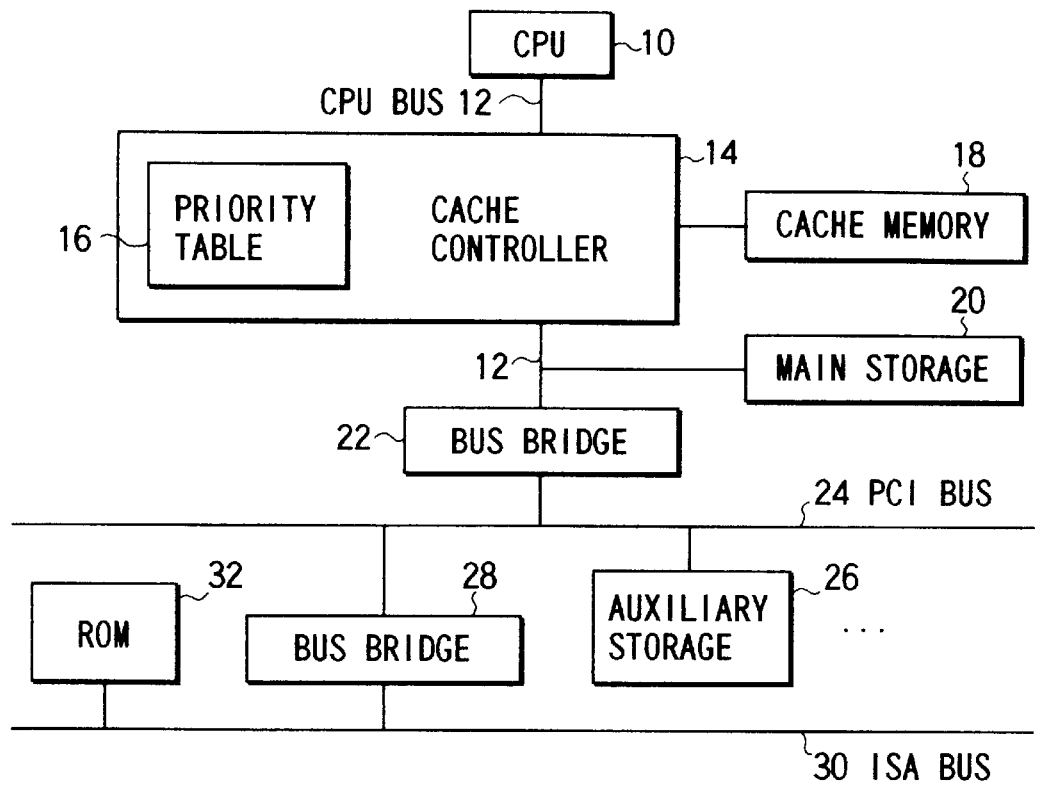
FIG. 1
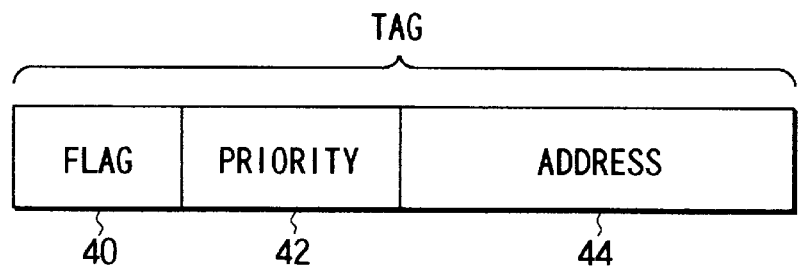
FIG. 2
PRIORITY TABLE
| ADDRESS | PRIORITY |
|---------|----------|
| 0 1 0 0 1 1 | 3 8 |
| 0 1 0 0 1 5 | 2 2 8 |
| 0 2 0 1 3 0 | 1 1 5 |
| ⋮ | ⋮ |
FIG. 3

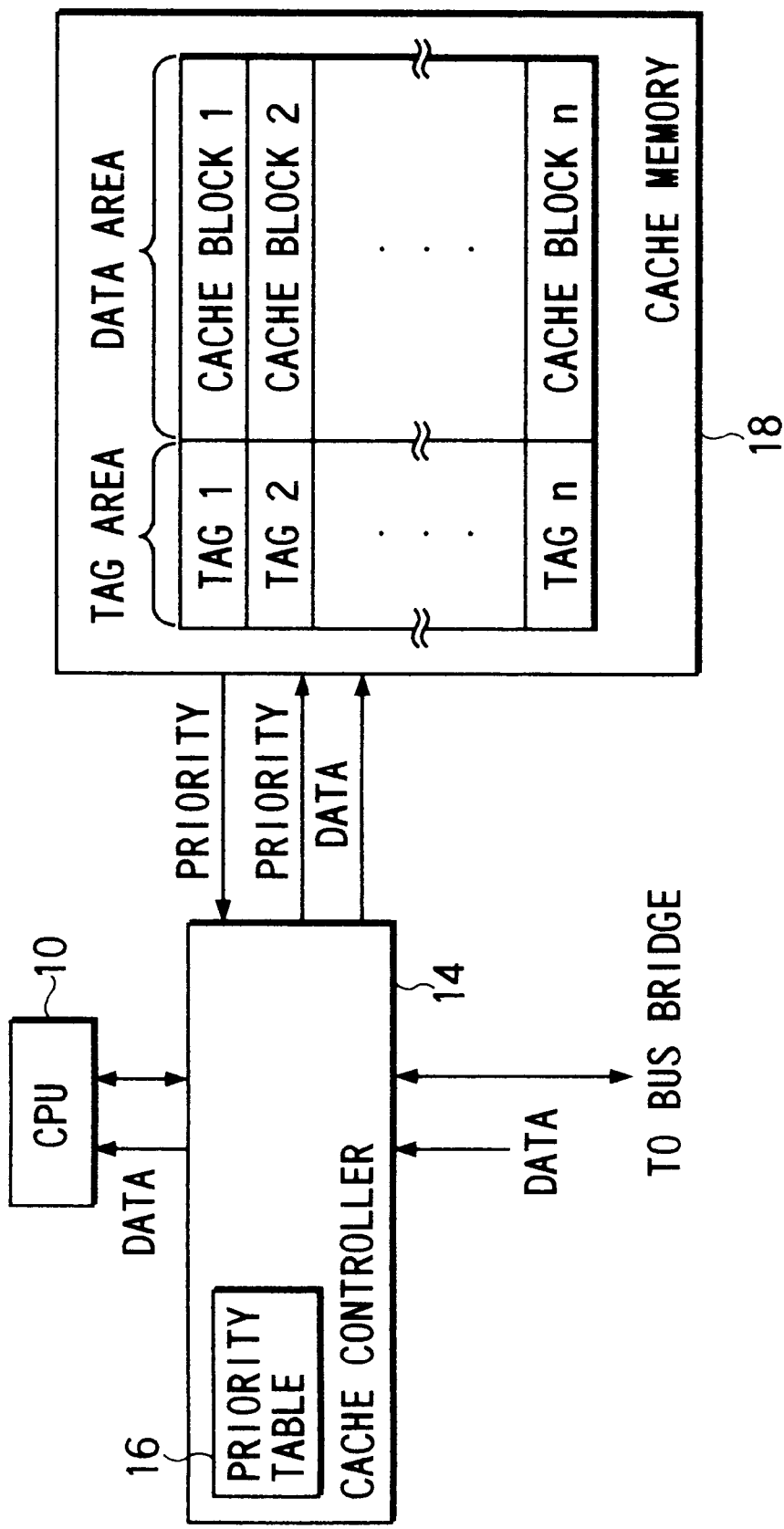
F I G. 5

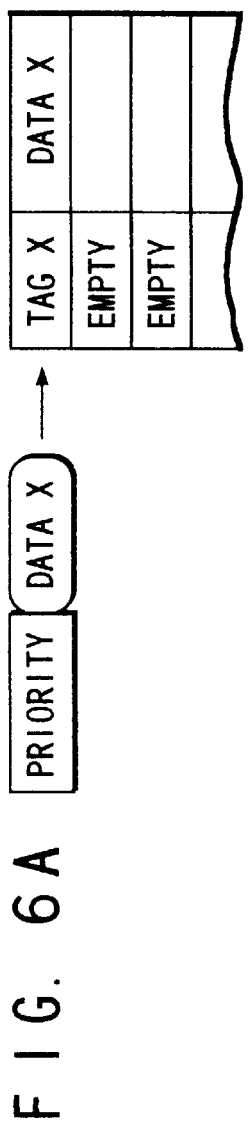
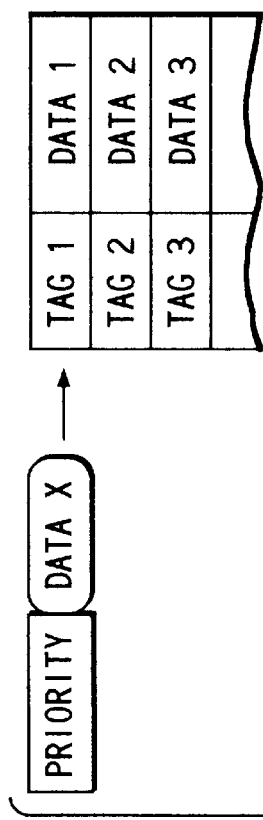
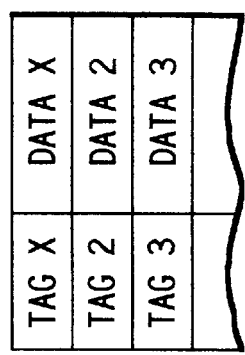
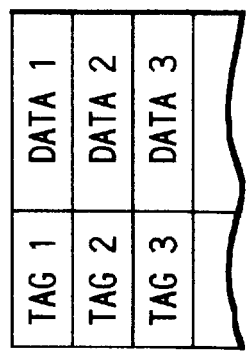
FIG. 6A
FIG. 6B

COMPUTER WITH A CACHE CONTROLLER AND CACHE MEMORY WITH A PRIORITY TABLE AND PRIORITY LEVELS

BACKGROUND OF THE INVENTION

The present invention relates to a computer with a cache function and to a cache memory control method.

In the field of computers, a cache function means a technique for storing data whose reading is requested by a processor (e.g. a CPU) of the computer, and data which is expected to be read next to the first-mentioned data, in a cache memory (which may consist of a SRAM expensive but capable of high speed operation) located near the CPU, and then reading target data first from the cache memory (if it is stored in the cache memory), not from its original memory area. This cache function can reduce the time required to read data and increase the total processing speed of the computer.

Since the memory capacity of the cache memory must be set much smaller than that of a main memory, an auxiliary storage device (e.g., a hard disk drive (HDD)), or a floppy disk drive (FDD), from which data is read, it is necessary to erase old data stored in the cache memory, in order to store new data read from such a storage device.

In the conventional cache memory control method, to erase data stored in the cache memory and store new data therein, the data to be erased is unconditionally erased.

It is evident that the higher the frequency of access for reading data, the greater the advantage of a high-speed operation realized by the cache memory, if the data is stored therein. Accordingly, the advantage of the cache memory which has a small memory capacity can be made the most of by storing therein, for as long time as possible, data to be read at high frequency.

In the conventional cache memory, however, old data stored therein is necessarily erased each time new data is written. In other words, there are many cases where new data to be read at low frequency is replaced, in the cache memory, with data to be read at high frequency. This being so, the advantage of the high-speed operation realized by the cache memory cannot be made the most of.

BRIEF SUMMARY OF THE INVENTION

It is the object of the present invention to provide a computer with a cache function and a cache memory control method, for enabling data, which is read at high frequency, to be stored in a cache memory for a long time.

According to a first aspect of the present invention, there is provided a computer system comprising a processor; a priority table for storing an address indicative of the original location of each of data items to be read by the processor, and a priority corresponding to the frequency of access by the processor to read each of the data items; a cache memory for storing, in units of cache blocks, part of the data items to be read by the processor, the cache memory having a tag which stores an address and a priority corresponding to each of the data items; and a controller including: means for obtaining, when a cache miss has occurred, a priority corresponding to data whose reading is requested by the processor, by referring to the priority table and using an address included in the data-reading request of the processor, and means for comparing the obtained priority with a priority of data stored in a predetermined cache block in the cache memory, thereby to determine whether or not data replacement should be performed in the predetermined cache block.

Preferably, the determination means determines to perform replacement of data when the obtained priority is higher than the priority of data prestored in the cache block. In this case, the controller may include a replacement executing means for erasing data in the predetermined cache block, writing into the predetermined cache block the data whose reading is requested by the processor, and writing the priority of the data into the tag area, when data replacement is determined to be performed.

More preferably, the determination means determines not to perform replacement of data when the priority of data prestored in the cache block is higher than the obtained priority. In this case, the controller may have means for reducing, by a predetermined degree, a priority stored in the tag and corresponding to the data when data replacement is determined not to be performed. For example, the controller may have means for reducing, by a degree of 1, a priority stored in the tag and corresponding to the data when data replacement is determined not to be performed.

Furthermore, the controller may have means for writing, into an empty cache block if there is any, the data whose reading is requested by the processor, and writing the priority of the data into the tag.

Also, the priority table may be incorporated in the controller.

According to a second aspect of the present invention, there is provided a computer system comprising: a processor; a priority table for storing an address indicative of the original location of each of data items to be read by the processor, and a priority corresponding to the frequency of access by the processor to read each of the data items; a cache memory for storing, in units of cache blocks, part of the data items to be read by the processor, the cache memory having a tag which stores an address and a priority degree corresponding to each of the data items; and a controller including means for obtaining, when a cache miss has occurred, a priority corresponding to data whose reading is requested by the processor, by referring to the priority table and using an address included in the data-reading request of the processor, means for comparing the obtained priority with a priority of data stored in a predetermined cache block in the cache memory, means for determining to perform replacement of data when the obtained priority is higher than the priority of data prestored in the cache block, replacement executing means for erasing data in the predetermined cache block, writing into the predetermined cache block the data whose reading is requested by the processor, and writing the priority of the data into the tag, when data replacement is determined to be performed, means for determining not to perform replacement of data when the priority of data prestored in the cache block is higher than the obtained priority, and means for reducing, by a predetermined degree, a priority stored in the tag and corresponding to the data when data replacement is determined not to be performed.

By virtue of the above-described structure, data of high priority (i.e. data to be accessed by the processor at a high frequency) can be stored in the cache memory for a longer period of time. Accordingly, the rate of cache hit (which means that data to be read by the processor exists in the cache memory) increases, thereby reducing the frequency at which data is read from the main storage or an external storage, etc.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram, showing the overall structure of a computer according to the embodiment of the present invention;

FIG. 2 is a view, showing an example of information stored in a tag of a tag area in a cache memory incorporated in the computer of FIG. 1;

FIG. 3 is a view, showing an example of data registered in a priority table incorporated in a cache controller in the computer of FIG. 1;

FIG. 5 is a view, useful in explaining the data-reading operation of the cache controller of the computer of FIG. 1; and FIGS. 6A and 6B are views, useful in explaining the cache control operation of the cache controller to control the cache memory.

DETAILED DESCRIPTION OF THE INVENTION

Figure 4:
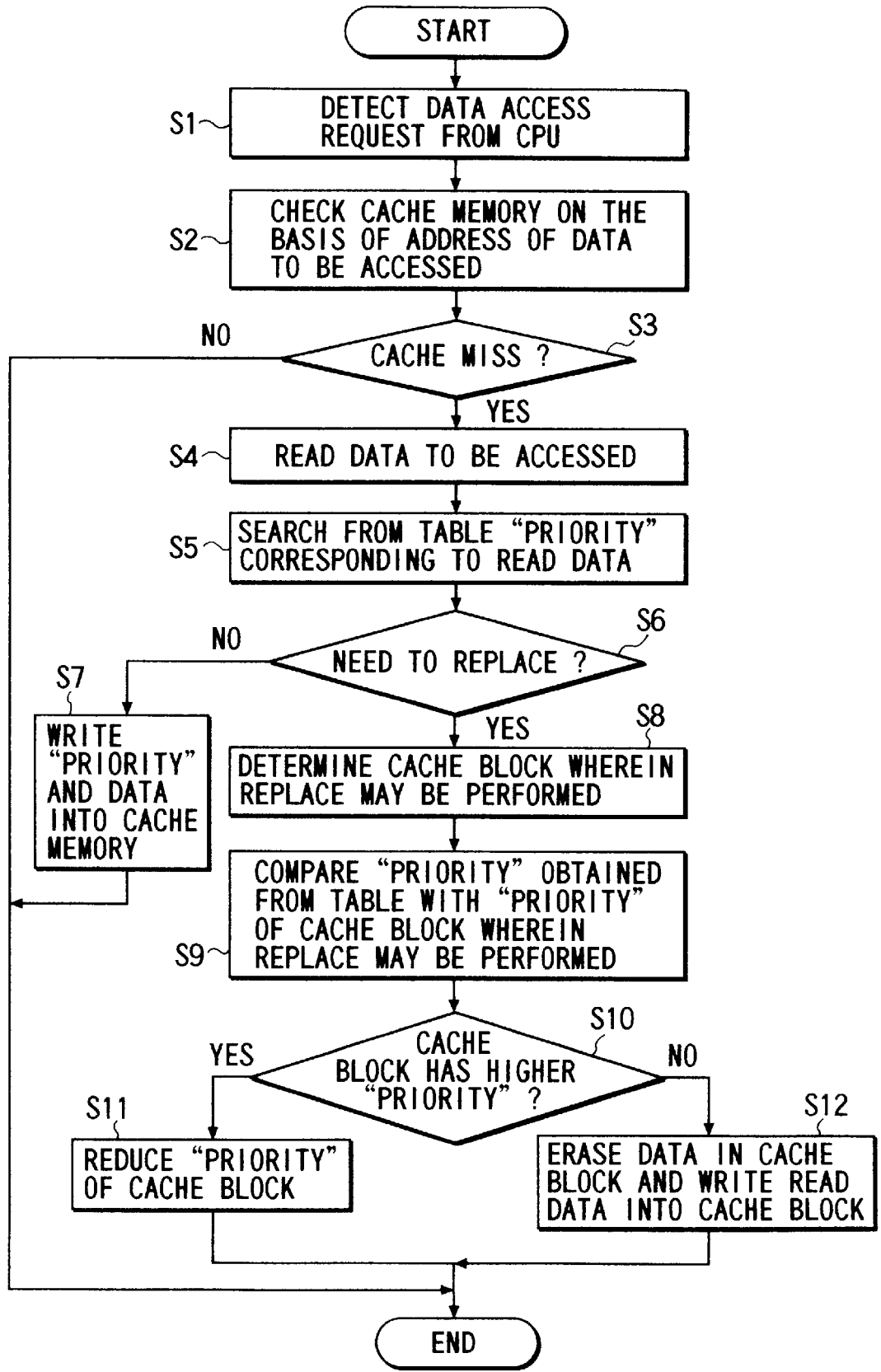
FIG. 4 is a flowchart, useful in explaining the operation of the cache controller in the computer of FIG. 1.

The embodiment of the present invention will be described with reference to the accompanying drawings.

FIG. 1 is a block diagram, showing the overall structure of a computer according to the embodiment of the present invention. As is shown in FIG. 1, the computer comprises a CPU 10, a CPU bus 12, a cache controller 14, a priority table 16, a cache memory 18, a main storage 20, a bus bridge 22, a PCI (Peripheral Component Interconnect) bus 24, an auxiliary storage 26, a bus bridge 28, an ISA (Industrial Standard Architecture) bus 30 and a ROM 32.

The CPU 10 is connected to the CPU bus 12 for accessing (requesting reading of) data, a command, etc. (hereinafter referred to simply as "data") using a cache function executed by the control of the cache controller 14.

The CPU bus 12 connects the bus bridge 22, the CPU 10 and the cache controller 14 to each other.

In response to the request of the CPU 10 to read data, the cache controller 14 controls the operation of the cache memory 18 on the basis of data (which will be described later) registered in the priority table 16.

The priority table 16 is one of features of the present invention. It shows the relationship between an address indicative of the original location of each data item to be accessed by the CPU 10, and a priority (a priority level or a priority degree) of the data item. (The priority corresponds to the frequency of access by the CPU 10 for accessing the data. The higher the frequency of access by the CPU 10, the higher the priority of the data.)

The cache memory 18 consists, for example, of an SRAM, and stores data in units of cache blocks under the control of the cache controller 14. The cache memory 18 has a data area for storing data items and a tag area for storing information indicative of whether the data stored in the data area is valid or invalid.

The main storage 20 consist, for example, of a DRAM, and stores data to be accessed by the CPU 10.

The bus bridge 22 connects the CPU bus 12 to the PCI bus 24.

The bus bridge 28 connects the PCI bus 24 to the ISA bus 30.

The ISA bus 30 is connected to the PCI bus 24 via the bus bridge 28, and also to the ROM 32, etc.

The ROM 32 is connected to the ISA bus 30 and stores data or a program (such as a BIOS) to be accessed by the CPU 10.

FIG. 2 shows an example of information stored in a tag of the tag area of the cache memory 18. As is shown in FIG. 2, each tag includes a flag 40 indicative of whether data stored in a corresponding cache block is valid or invalid, a "priority" 42 for the data in the cache block, and an address 44 indicative of the original location of the data. The "priority" 42 included in each tag is one of the features of the present invention. The tag may store another flag (not shown) for managing data stored in (the data area of) the cache memory.

When it is necessary to store, in the cache memory 18, data access to which is requested by the CPU 10, the data is stored in a predetermined cache block and its priority is included in a corresponding tag, which differs from the conventional case. Specifically, a priority corresponding to the data is read from the priority table 16 by the cache controller 14, and stored in a predetermined cache line (a combination of a corresponding tag and a corresponding cache block), together with the data.

FIG. 3 shows an example of information registered in the priority table 16 incorporated in the cache controller 14. As is shown in FIG. 3, the priority table 16 registers, for each data item stored in storage mediums (such as the main storage 20, the auxiliary storage 26, the ROM 32 and other peripheral devices) to be accessed by the CPU 10, an address indicative of the original location of the data, and a priority corresponding to the data.

The address indicates the original location of the data item as in the main storage 20, the ROM 23, the auxiliary storage 26, etc. Further, the degree of priority is expressed, for example, by a value of one byte (a numerical value included in 256 values).

In the priority table 16, the priority of the BIOS stored in the ROM 32, and that of data stored in the main storage 20, etc. are set in accordance with the frequencies at which these data items are read by the CPU 10, respectively. For example, the higher the frequency of access by the CPU 10, the higher the priority. Moreover, a priority may be assigned to a predetermined data item relating to an OS (Operating System) or an application. For example, in a system which performs dynamic link, a higher priority may be assigned to important data relating to an essential program or a library of functions.

The operation of the cache controller 14 employed in the present invention will now be described with reference to the flowchart of FIG. 4. FIG. 5 is a view useful in explaining the reading operation of the cache controller 14, and FIGS. 6A and 6B are views useful in explaining the cache control operation of the cache controller 14 for controlling the cache memory 18.

Suppose that the cache controller 14 is monitoring the transmission of data in the CPU bus 12. When the CPU 10 supplies the CPU bus 12 with a request for access; the cache controller 14 detects the request for access (step S1).

The cache controller 14 in turn checks tags in the tag area (address section) of the cache memory 18 to determine whether or not data requested to be accessed exists in the data area of the cache memory 18 on the basis of an address assigned to the data (step S2).

If "cache hit" occurs (i.e. if the cache memory 18 stores the data to be accessed), the cache controller 14 supplies the CPU 10 with the data stored in a cache block in the cache memory 18.

If, on the other hand, a cache miss occurs (i.e. if the cache memory 18 does not store the data to be accessed), the cache controller 14 reads the to-be-accessed data from the main storage 20, the auxiliary storage 26, the ROM 32, or the like (step S4). While the newly read data is output to the CPU 10, the cache controller 14 performs caching of the newly read data (see FIG. 5), which will be described later.

The cache controller 14 obtains, from the priority table 16, a priority to be assigned to the read data (step S5). Specifically, the cache controller 14 searches in the priority table 16 an address corresponding to the address assigned to the read data, thereby obtaining a priority to be assigned to the read data. If there is no corresponding priority, the priority of the read data is set to "0".

Then, the cache controller 14 determines that cache block in the cache memory 18 in which the read data should be stored. If the data area of the cache memory 18 has an empty cache block, i.e. if it is not necessary to replace data stored in any of cache blocks (step S6), the cache controller 14 stores (caches) the read data in the empty cache block unconditionally.

Supposing that the read data is data X, it is stored in an empty cache block as shown in FIG. 6A. At this time, the cache controller 14 writes, into the tag corresponding to the empty cache block, a priority to be assigned to the data X.

If, on the other hand, the data area of the cache memory 18 has no empty cache block and new data must be written into an occupied cache block, i.e. if it is necessary to replace old data with new one in one of cache blocks (step S6), the cache controller 14 determines that one of the cache blocks in which data replacement should be performed (step S8), and compares a priority stored in the tag of the one cache block, with the priority of the new data to be written (the priority obtained from the priority table 16) (step S9).

If it is determined as a result of the comparison that the priority stored in the tag is higher, i.e. if the priority of the data stored in the cache memory 18 is higher, the cache controller 14 does not write the new data into the cache block.

In this case, the cache controller 14 reduces, by e.g. a degree of 1, the priority included in the tag corresponding to the cache block (step S11). This processing is performed in order to prevent data stored in the cache block, which is determined to be a target block wherein data replacement may be performed, from being kept unchanged because of the fact that a high priority is assigned to the cache block.

On the other hand, if the priority stored in the tag is lower, i.e. if the priority of the newly read data is higher, the cache controller 14 erases data stored in the cache block in the cache memory 18 (if the data stored in the cache block is once changed in the cache memory, it is returned into the original location such as the main storage 20, etc.), thereby writing the newly read data into the cache block (step S12). At this time, a tag corresponding to the cache block with the new data stores a priority corresponding to the new data and obtained from the priority table 16, and an address assigned to the new data.

As is shown in FIG. 6B, if the priority of the new data X is higher, old data 1 is erased from the cache block, and the data X is stored therein together with a tag X which includes a priority corresponding to the data X.

On the other hand, where the already cached data 1 has a higher priority, the new data is not stored in the cache memory 18.

As described above, the priority table 16 to which the cache controller 14 refers stores addresses assigned to data items to be accessed by the CPU 10 and indicating the original locations thereof, and the priority of each of the data items (corresponding to the frequency of access by the CPU 10). When new data is read, the priority of the new data is compared with that of data prestored in the cache memory 18, and that one of these data items which is determined to have a higher priority is stored in the cache memory 18. Thus, data which is accessed by the CPU 10 at a high frequency can be stored in the cache memory 18 for a longer period of time. Accordingly, the rate of "cache hit" increases, thereby reducing the wait time required to read data and hence increasing the speed of program execution. As a result, the overall processing speed of the computer increases.

Although in the above-described embodiment, the priority table 16 incorporated in the cache controller 14 prestores priorities corresponding to data items and addresses indicative of original locations thereof, the information stored in the priority table 16 may be dynamically modified.

For example, at the time of changing the location of data (e.g. the location of the data in the main storage 20) corresponding to an address stored in the priority table 16, the address in the table 16 is changed to a new one indicative of the new location of the data.

In addition, although in the above-described embodiment, the priority table 16 is incorporated in the cache controller 14, it may be provided in an external memory which the cache controller 14 can directly access. In this case, when the original location of data in the ROM 32 or the main storage 20 is changed, the change may be dealt with by shifting the memory which stores the priority table 16 from one to another.

As described in detail, in the present invention, the priority table for storing "address" and "priority" corresponding to data to be accessed by the CPU is provided, and the cache operation is controlled using the priority table. By virtue of this structure, data to be accessed at high frequency (data of high priority) can be stored in the cache memory for a longer period of time, thereby enhancing the rate of "cache hit". As a result, the number of access by the CPU to read data from the main storage or the auxiliary storage is reduced, which increases the overall operation speed of the computer.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A computer system comprising:

a processor;

a priority table for storing an address indicative of the original location of each data items to be read by the processor and a priority level corresponding to the frequency of access by the processor to read each of the data items;

a cache memory for storing, in units of cache blocks, part of the data items to be read by the processor, the cache memory having a tag which stores an address and a priority level corresponding to each of the data items; and a controller including:

means for obtaining, when a cache miss has occurred, a priority level corresponding to data requested by the processor, by referring to the priority table and using an address included in the request of the processor, and means for comparing the obtained priority level with a priority level of data stored in a predetermined cache block in the cache memory, thereby to determine whether data replacement should be performed in the predetermined cache block.

2. The computer system according to claim 1, wherein the determination means determines to perform replacement of data when the obtained priority level is higher than the priority level of data prestored in the cache block.

3. The computer system according to claim 2, wherein the controller includes a replacement executing means for erasing data in the predetermined cache block, writing into the predetermined cache block the data whose reading is requested by the processor, and writing the priority level of the data into the tag, when data replacement is determined to be performed.

4. The computer system according to claim 1, wherein the determination means determines not to perform replacement of data when the priority level of data prestored in the cache block is higher than the obtained priority level.

5. The computer system according to claim 4, wherein the controller has means for reducing, by a predetermined degree, a priority level stored in the tag and corresponding to the data when data replacement is determined not to be performed.

6. The computer system according to claim 4, wherein the controller has means for reducing, by a degree of 1, a priority level stored in the tag and corresponding to the data when data replacement is determined not to be performed.

7. The computer system according to claim 1, wherein the controller has means for writing, into an empty cache block if there is any, the data whose reading is requested by the processor, and writing the priority level of the data into the tag.

8. The computer system according to claim 1, wherein the priority table is incorporated in the controller.

9. A computer system comprising:

a processor;

a priority table for storing an address indicative of the original location of each of data items to be read by the processor, and a priority level corresponding to the frequency of access by the processor to read each of the data items;

a cache memory for storing, in units of cache blocks, part of the data items to be read by the processor, the cache memory having a tag which stores an address and a priority level corresponding to each of the data items; and a controller including:

means for obtaining, when a cache miss has occurred, a priority level corresponding to data whose reading is requested by the processor, by referring to the priority table and using an address included in the data-reading request of the processor, means for comparing the obtained priority level with a priority level of data stored in a predetermined cache block in the cache memory, means for determining to perform replacement of data when the obtained priority level is higher than the priority level of data prestored in the cache block, replacement executing means for erasing data in the predetermined cache block, writing into the predetermined cache block the data requested by the processor, and writing the priority level of the data into the tag, when data replacement is determined to be performed, means for determining not to perform replacement of data when the priority level of data prestored in the cache block is higher than the obtained priority level, and means for reducing, by a predetermined degree, a priority level stored in the tag and corresponding to the data when data replacement is determined not to be performed.

10. A cache memory control method for use in a computer system having a processor and a cache memory for storing, in units of cache blocks, part of the data items to be read by the processor, comprising the steps of:

providing a priority table for storing an address indicative of the original location of each of data items to be read by the processor, and a priority level corresponding to the frequency of access by the processor to read each of the data items;

storing, in a tag in the cache memory, an address and a priority level corresponding to each of the data items;

obtaining, when a cache miss has occurred, a priority level corresponding to data requested by the processor, by referring to the priority table and using an address included in the request of the processor; and comparing the obtained priority level with a priority level of data stored in a predetermined cache block in the cache memory, thereby to determine whether or not data replacement should be performed in the predetermined cache block.

11. The method according to claim 10, wherein in the determination step, it is determined to perform replacement of data when the obtained priority level is higher than the priority level of data prestored in the cache block.

12. The method according to claim 11, further comprising the step of erasing data in the predetermined cache block, writing into the predetermined cache block the data whose reading is requested by the processor, and writing the priority level of the data into the tag, when data replacement is determined to be performed.

13. The method according to claim 10, wherein in the determination step, it is determined not to perform replacement of data when the priority level of data prestored in the cache block is higher than the obtained priority level.

14. The method according to claim 13, further comprising the step of reducing, by a predetermined degree, a priority level stored in the tag and corresponding to the data when data replacement is determined not to be performed.

15. The method according to claim 13, further comprising the step of reducing, by a degree of 1, a priority level stored in the tag and corresponding to the data when data replacement is determined not to be performed.

16. The method according to claim 10, further comprising writing, into an empty cache block if there is any, the data whose reading is requested by the processor, and writing the priority level of the data into the tag.

17. A cache memory control method for use in computer system having a processor and a cache memory for storing, in units of cache blocks, part of the data items to be read by the processor, comprising the steps of:

provinding a priority table for storing an address indicative of the original location of each of data items to be read by the processor, and a priority level corresponding to the frequency of access by the processor to read each of the data items;

storing, in a tag in the cache memory, an address and a priority level corresponding to each of the data items;

obtaining, when a cache miss has occurred, a priority level corresponding to data whose reading is requested by the processor, by referring to the priority table and using an address included in the data-reading request of the processor;

comparing the obtained priority level with a priority level of data stored in a predetermined cache block in the cache memory;

determining to perform replacement of data when the obtained priority is higher than the priority level of data prestored in the cache block;

erasing data in the predetermined cache block, writing into the predetermined cache block the data requested by the processor, and writing the priority level of the data into the tag, when data replacement is determined to be performed;

determining not to perform replacement of data when the priority level of data prestored in the cache block is higher than the obtained priority level; and reducing, by a predetermined degree, a priority level stored in the tag and corresponding to the data when data replacement is determined not to be performed.

18. The computer system according to claim 1, wherein the priority level in the priority table is predetermined.

19. The computer system according to claim 1, wherein the priority level is expressed by a numerical value of one byte.

20. The method according to claim 10, wherein the priority level in the priority table is predetermined.

21. The method according to claim 10, wherein the priority level is expressed by a numerical value of one byte.

22. A computer system comprising:

a processor;

a priority table for storing an address indicative of the original location of each data items to be read by the processor and a priority level corresponding to the frequency of access by the processor to read each of the data items;

a cache memory for storing, in units of cache blocks, part of the data items to be read by the processor, the cache memory having a tag which stores an address and a priority level corresponding to each of the data items; and a controller including:

means for obtaining, when a cache miss has occurred, a priority level corresponding to data requested by the processor, by referring to the priority table and using an address included in the request of the processor;

means for comparing the obtained priority level with a priority level of data stored in a predetermined cache block in the cache memory;

means for determining whether the data replacement should be performed in the predetermined cache block; and means for reducing, by a degree of one, a priority level stored in the tag corresponding to the data when the priority level of data prestored in the cache block is higher than the obtained priority level data.

23. A cache memory control method for use in a computer system having a processor and a cache memory for storing, in units of cache blocks, part of the data items to be read by the processor, comprising the steps of:

providing a priority table for storing an address indicative of the original location of each data item to be read by the processor, and a priority level corresponding to the frequency of access by the processor to read each of the data items;

storing, in a tag in the cache memory, an address and a priority level corresponding to each of the data items;

obtaining, when a cache miss has occurred, a priority level corresponding to data requested by the processor, by referring to the priority table and using an address included in the request of the processor;

comparing the obtained priority level with a priority level of data stored in a predetermined cache block in the cache memory;

determining whether the data replacement should be performed in the predetermined cache block; and reducing, by a degree of one, a priority level stored in the tag corresponding to the data when the priority level of data prestored in the cache block is higher than the obtained priority level data.

* * * * *

UNITED STATES PATENT AND TRADEMARK OFFICE
CERTIFICATE OF CORRECTION

PATENT NO. : 5,906,000
DATED : May 18, 1999
INVENTOR(S) : Abe et al.

It is certified that error appears in the above-identified patent and that said Letters Patent is hereby corrected as shown below:

Claim 1, column 7, line 2, before "data items", insert --of--.

Claim 22, column 9, line 48, before "data items", insert --of--.

Signed and Sealed this

Fifteenth Day of February, 2000

Attest:

Q. TODD DICKINSON

Attesting Officer     Commissioner of Patents and Trademarks